United States Patent
Currie et al.

(10) Patent No.: US 6,275,785 B1
(45) Date of Patent: Aug. 14, 2001

(54) HARDWARE SIMULATOR FOR A TRANSACTION PROCESSING SYSTEM

(75) Inventors: Stuart Currie; John Martin Flenley, both of Havant (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/190,752

(22) Filed: Nov. 12, 1998

(30) Foreign Application Priority Data

Nov. 15, 1997 (GB) .................................................. 9724061

(51) Int. Cl.[7] .............................. G06F 17/50; G06F 9/45; G06F 9/44; G06F 13/10; G06G 7/62
(52) U.S. Cl. ................................. 703/13; 703/21; 703/22; 703/24
(58) Field of Search ................................. 703/21–22, 24, 703/13

(56) References Cited

U.S. PATENT DOCUMENTS

| 5,263,164 | * | 11/1993 | Kannady | .................................. | 713/1 |
| 5,577,197 | * | 11/1996 | Beck | ........................................ | 714/28 |
| 5,680,610 | * | 10/1997 | Smith et al. | ............................ | 707/10 |
| 5,691,897 | * | 11/1997 | Brown et al. | ........................... | 700/56 |
| 5,740,353 | * | 4/1998 | Kreulen et al. | ......................... | 714/42 |
| 5,761,486 | * | 6/1998 | Watanabe et al. | ...................... | 703/21 |

FOREIGN PATENT DOCUMENTS

WO92/12480  7/1992 (WO) .

OTHER PUBLICATIONS

Bennett et al.; "Derivation and performance of a pipelined transaction processor"; 6th IEEE Symp. Parallel and Distributed Processing; pp. 178–185, Oct. 1994.*

* cited by examiner

*Primary Examiner*—Kevin J. Teska
*Assistant Examiner*—Hugh Jones
(74) *Attorney, Agent, or Firm*—Karl O. Hesse

(57) ABSTRACT

A hardware simulator (46',100) for a transaction processing system (20,40) is disclosed. The transaction processing system is responsive to transaction requests (12) from an application (10). The simulator comprises a set of virtual hardware modules (46') for simulating execution of transaction requests and a simulator tool (100). Each virtual hardware module is responsive to transaction requests relayed from the transaction processing system and is adapted to write the requests to an associated area of shared memory (200). The simulator tool is adapted to graphically represent a set of hardware devices, for example, an ATM. Each hardware device graphical representation (FIG. 7) is associated with an area of shared memory (200). The tool is adapted to monitor these areas of shared memory and to update a hardware device graphical representation in response to a transaction request being written to an area of shared memory associated with the graphical representation. The tool is further responsive to user interaction with one or more of said hardware device graphical representations to write the results of said the interaction to an area of shared memory associated with the or each graphical representation. One or more of the virtual hardware modules is adapted to monitor an associated area of shared memory, and to communicate with the application (10) in response to a user interaction result being written to the associated area of shared memory.

21 Claims, 8 Drawing Sheets

HARDWARE SIMULATOR FOR A TRANSACTION PROCESSING SYSTEM

BACKGROUND OF THE INVENTION

1. Field of the Invention

The present invention relates to a hardware simulator for a transaction processing system.

2. Description of Related Art

As financial and other commercial institutions become increasingly automated, they continually wish to develop both in-house computer applications and customer related applications. This automation often depends on acquiring newly developed hardware, and it is critical for gaining a competitive advantage that institutions are able to select between different hardware suppliers.

Without the ability to write vendor independent applications, financial institutions would be forced to adapt their ATM applications if they change ATM vendors; similarly supermarket chains would be forced to adapt their applications if they changed till vendors. This increases application development time and costs and restricts the freedom of the institutions to choose between vendors.

WOSA/XFS (Windows Open Services Architecture for Extended Financial Services) is an emerging standard enabling financial institutions, whose branch and office solutions run on the Windows NT platform, to develop applications independent of vendor equipment.

FIG. 1 shows the standard WOSA model. Using this model, an application 10 communicates hardware requests 12 to various hardware devices in, for example, an ATM 14 via a WOSA manager 20. The application issues transaction requests 12 which are hardware independent, and thus vendor independent. The requests are queued by the WOSA manager 20 which manages concurrent access to the ATM hardware 14 from any number of applications 10.

When a piece of hardware is installed on the ATM, it registers its controlling software, known as a service provider module (SPM) 30, with the WOSA manager by using, for example, the Windows registry. The WOSA manager 20 is thus able to relay a hardware request 12 to an appropriate SPM 30, using the Windows registry as a look-up table. The SPM 30 takes relayed hardware independent requests 16 from the WOSA manager and actuates the appropriate piece of hardware to process the requests. The results of a request can be returned by an SPM 30 synchronously via the WOSA manager 20 or asynchronously by generating a Windows event.

One of the problems associated with developing applications for financial devices such as Automated Teller Machines, kiosks or supermarket tills, is that multiple developers need access to expensive hardware for long periods of the development cycle. This can be inconvenient as users must copy development code and platforms to machines in different locations, for example a laboratory, plus there are inevitable conflicts over access to hardware as deadlines approach.

DISCLOSURE OF THE INVENTION

Accordingly, the present invention provides a hardware simulator for a transaction processing system, said transaction processing system being responsive to transaction requests from an application, said simulator comprising: a set of virtual hardware modules for simulating execution of transaction requests, each virtual hardware module being responsive to transaction requests relayed from said transaction processing system and being adapted to write said requests to an associated shared resource; a simulator tool, said tool being adapted to graphically represent a set of hardware devices, each hardware device graphical representation being associated with a shared resource, said tool being adapted to monitor said shared resource and to update a hardware device graphical representation in response to a transaction request being written to a shared resource associated with said graphical representation.

The hardware simulator according to the present invention solves many early development lifecycle problems by providing to the user a hardware platform that can run on a desktop computer, freeing the user from the requirement that they have access to the real hardware until the time comes for final integration testing.

The hardware simulator according to the present embodiment provides a 100% WOSA/XFS 2.0 compliant virtual hardware environment for the all the devices in, for example, an ATM. It will be seen, however, that the invention is not limited to WOSA or an ATM and is applicable wherever an application needs to be tested with hardware.

DESCRIPTION OF THE PREFERRED EMBODIMENTS

Figure 1:
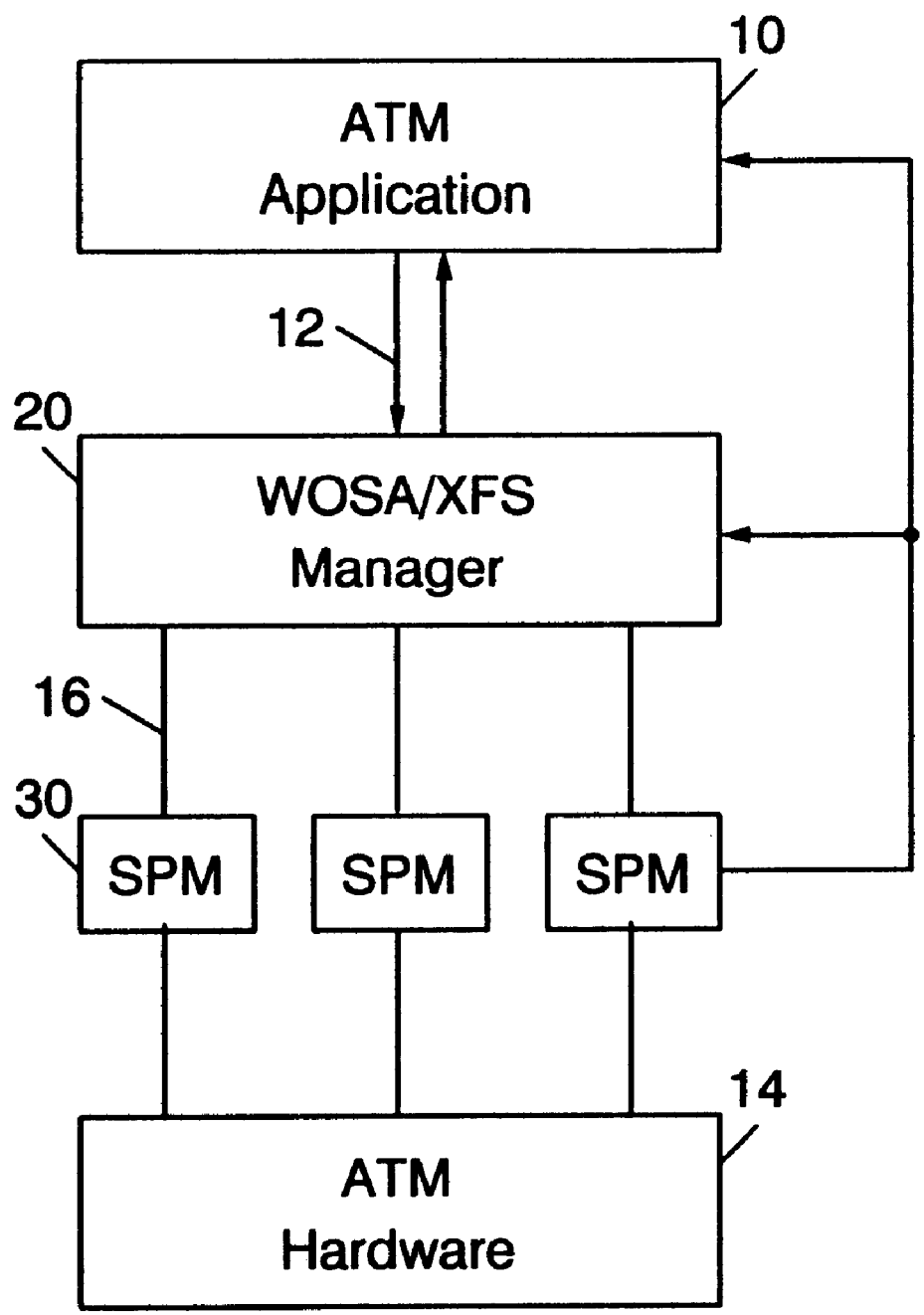
FIG. 1 shows a standard WOSA single process transaction processing system operable with a hardware simulator according to the present invention.

Referring now to FIG. 1, the standard WOSA model includes three layers. An application layer 10 issues transaction requests in the form of hardware independent Application Programming Interface (API) calls 12 to a WOSA Manager 20 layer in order to access services from a Service Provider 30 layer. All components exist within the same process (the Application's) and memory address space.

WOSA is a classic single process model, where all components of the solution run in the same process. If a single thread within this process abends, it will normally take the entire process down. Although this is acceptable in non-critical applications, for example printing, it is not acceptable where security is involved and where detailed audit trails are required. The best example of this case is where ATM cash dispensing is involved. If the process abends while a dispense is taking place, the error needs to be recoverable in order to determine the disposition of the cash involved.

Figure 2:
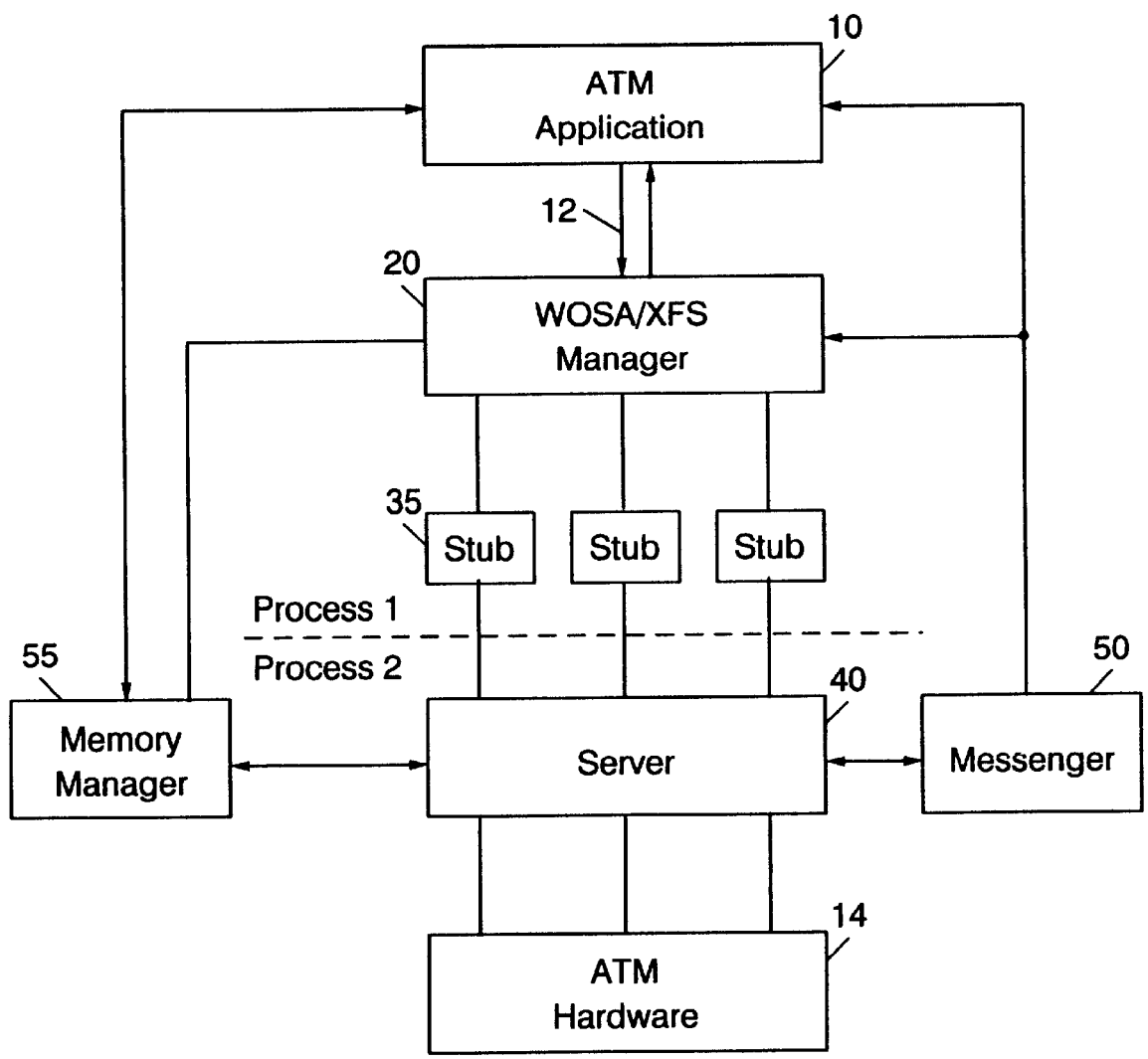
FIG. 2 shows an alternative transaction processing system operable with the hardware simulator according to the present invention.

In the alternative server model of FIG. 2, the application 10 and WOSA Manager 20 exist within the same user application process. The WOSA manager 20, however, communicates with stub Dynamic Link Libraries (DLLs) 35 each corresponding to a respective SPM 30 of FIG. 1. The system is preferably implemented in an object oriented manner and will be described in those terms.

Transaction requests 12 from the application layer 10 pass through the WOSA Manager 20 to the stub DLLs 35, where the data is repackaged and passed across process boundaries to a server 40 running in a separate process, where the required transaction request is actually executed. The server 40 communicates with SPM's 30 to execute the transaction request, and any execution results are either passed back from the SPMs to the application 10 through the WOSA manager 20, via the stub DLLs 35, or via an operating system messenger 50. In a Windows NT operating system embodiment, the SPMs 30 generate windows events using an application nominated window handle, whereas in an embodiment using IBM's OS/2 operating system, the SPMs generate presentation manager events to communicate directly with an application 10.

The method of response is determined by the Application 10, depending on whether a transaction request issued is specified as synchronous (the server responds through the stub DLL mechanism) or asynchronous (the server responds via the Windows Event mechanism).

Information is also accessible by both the application 10 and the SPMs using shared memory. When, for example, an SPM 30 wishes to transmit information to an application 10, the SPM sends a WOSA call to the WOSA manager 20 which communicates with an operating system memory manager 55 to allocate the shared memory. Once allocated, then SPMs 30 in the server 40 process or applications 10 can read or write information from this shared memory.

Figure 3:
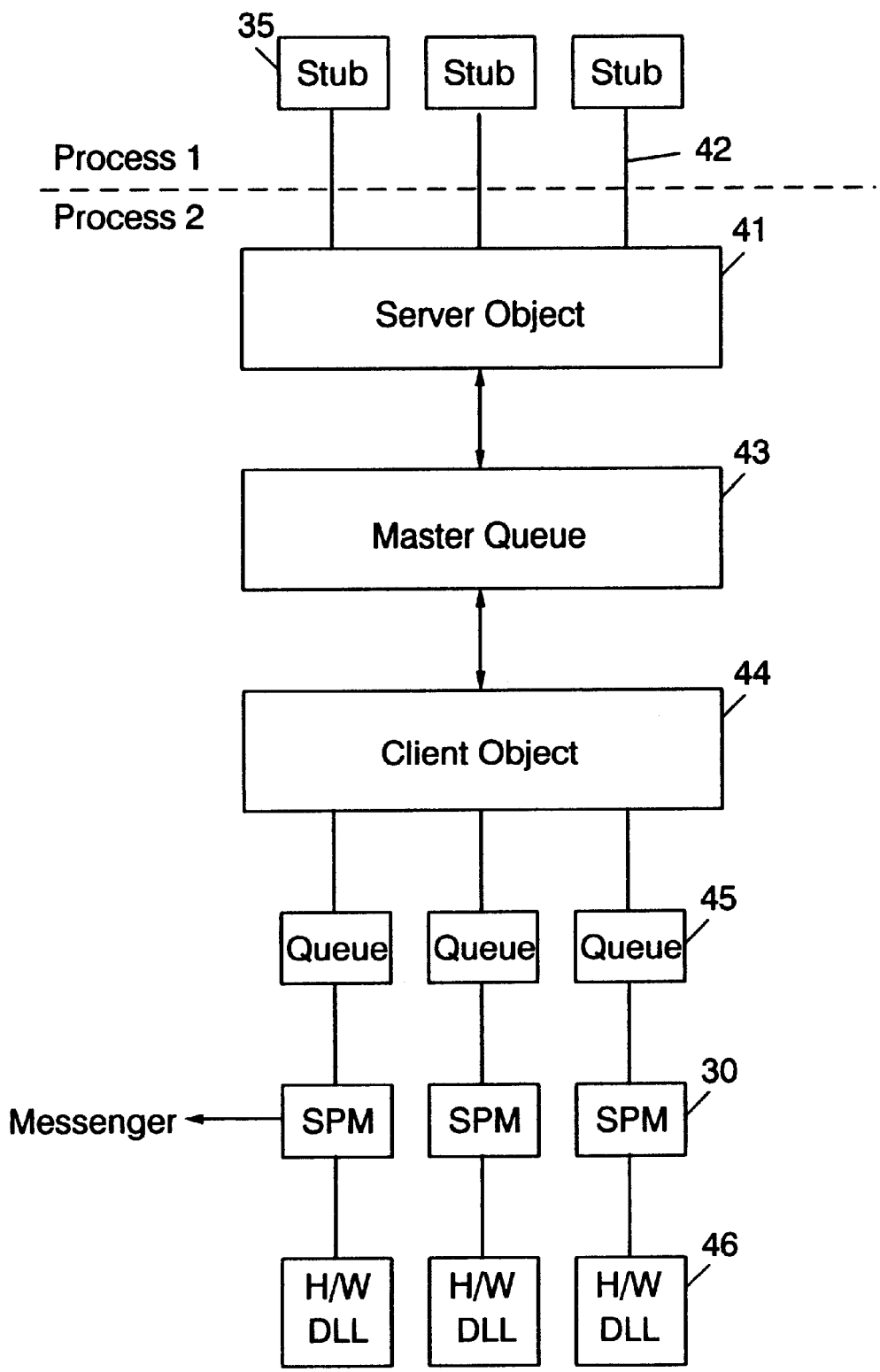
FIG. 3 shows a server component of the transaction processing system of FIG. 2 in more detail.

FIG. 3, shows the server 40 in more detail. The server is a multi-threaded application supporting the simultaneous execution of transaction requests on all of its supported WOSA device classes explained below. The server 40 consists of the following major components:

A server object 41 runs in its own thread and has responsibility for creating and monitoring memory 'pipes' 42 connecting the server process to respective stub DLLs 35, running in the user application process. When the server object detects a transaction request packet from one of the stub DLLs 35 waiting in its associated 'pipe' 42, it moves the packet into a master queue 43 and thus frees the pipe for more communications. The server also detects packets in the master queue 43 that are response packets from service provider modules 30, and channels these back through the 'pipes' to the correct stub DLL 35, which then passes the response back to the user application 10 via the WOSA Manager.

The memory pipes 42 are implemented in a class including essentially three methods: readPipe(), writePipe(), queryPipe() with the methods being passed an identifier corresponding to the stub DLL associated with the pipe. In the application process, a stub DLL 35 receives a WOSA transaction request from the transaction manager and calls the writePipe method to place the request in its pipe 42. writePipe essentially writes a message to a designated location in shared memory with a flag indicating that the message needs to be read. Once the stub DLL 35 has written the message to the pipe, it then polls its pipe 42 continually using queryPipe to determine when a response has been sent from the server 41 or if the message has been read.

Within the server process, the server object 41 continually polls each of the pipes 42 using the queryPipe method for each pipe in turn to determine if messages are waiting to be processed. If a pipe has a message, the server calls readPipe to read the message from the pipe, reset the message flag indicating that the message has been read and places the message in the master queue 43. The server also interrogates the master queue 43, and if a message for the server 41 is in the master queue 43, the server 41 pops the messages from the queue and calls writePipe to place the message in the appropriate pipe and thereafter reverts back to querying the pipe for the next message.

A client object 44 runs in its own thread and is responsible for creating and managing the supported service provider modules 30 below it. The client object 44 monitors the server master queue 43 and when it detects an inbound packet for one of its managed hardware devices, it moves the packet from the queue 43 on to a private queue 45 associated with a target device.

Instances of service provider module objects 30 are created at startup time by the client. In the case of an ATM, objects would be instantiated for a journal printer, receipt printer, passbook printer, statement printer, deposit unit, cash dispenser, magnetic card reader/smart card reader, sensors and indicators unit, pinpad unit, encryptor unit, vendor dependant mode (VDM) unit, and text terminal unit. Other objects could also be instantiated for a camera or a screen. Each instantiation spawns its own control thread that is responsible for monitoring its own private queue 45 for requests that are placed there by the client object 44. When an SPM object 30 detects a request waiting on its private queue 45, or if there is a request pending execution and it is time to attempt to process pending requests again, the SPM object spawns an execution thread that handles the execution of that single request. The execution thread has the responsibility of processing the request to its conclusion, either returning the relevant data to the caller application 10 via events, marking the request as 'pending' on the queue 45 and completing, or returning a response by returning a completed packet back to the server queue 43 for transmission to the stub DLL 35 associated with that hardware device.

In the absence of the present invention, each SPM 30 converts all WOSA transaction requests into one or more generic commands that are processed by a layer of small hardware DLLs 46. An Application Programming Interface (API) for each type of hardware device is published by the hardware vendor and consists of the minimum number of hardware level commands (example read_card on a magnetic stripe reader device, or dispense_cash on a dispenser) that can satisfy the complete set of WOSA transaction requests for that device type. For example, a respective hardware DLL is supplied for both an IBM Dispenser and an Olivetti dispenser. The user only has to change which DLL is active, by updating the Windows registry in order to switch between the different devices. At the application and server layers, nothing changes. The same is true for all device types.

Figure 4:
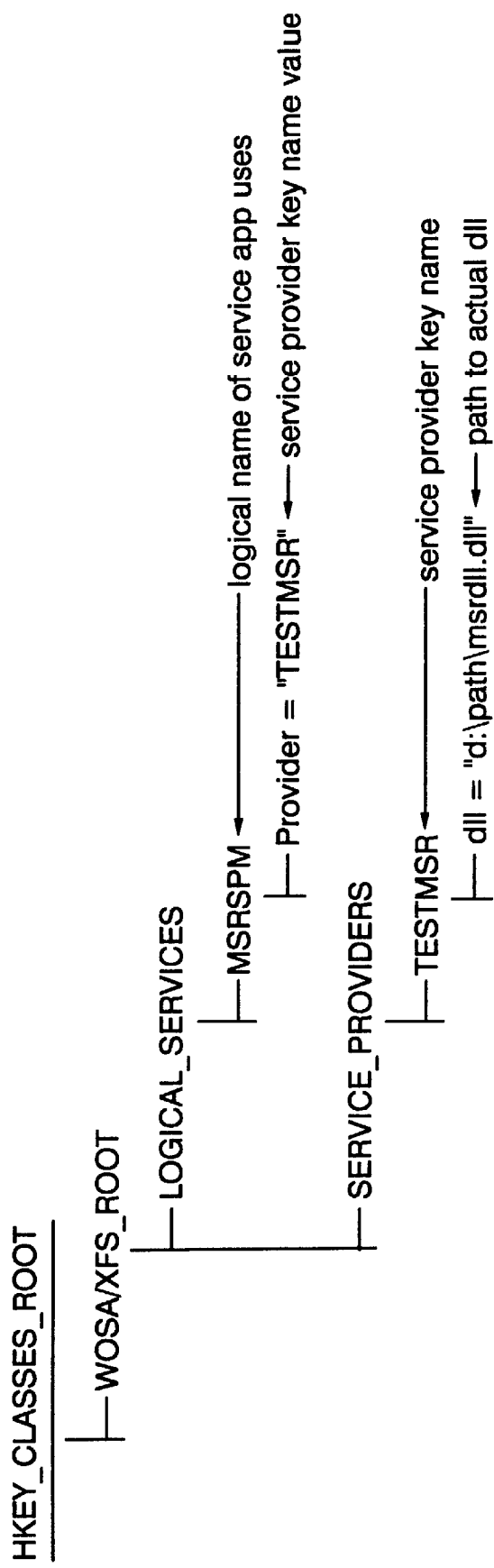
FIG. 4 is a schematic view of a portion of a Windows NT registry employed by a WOSA manager.
Figure 5:
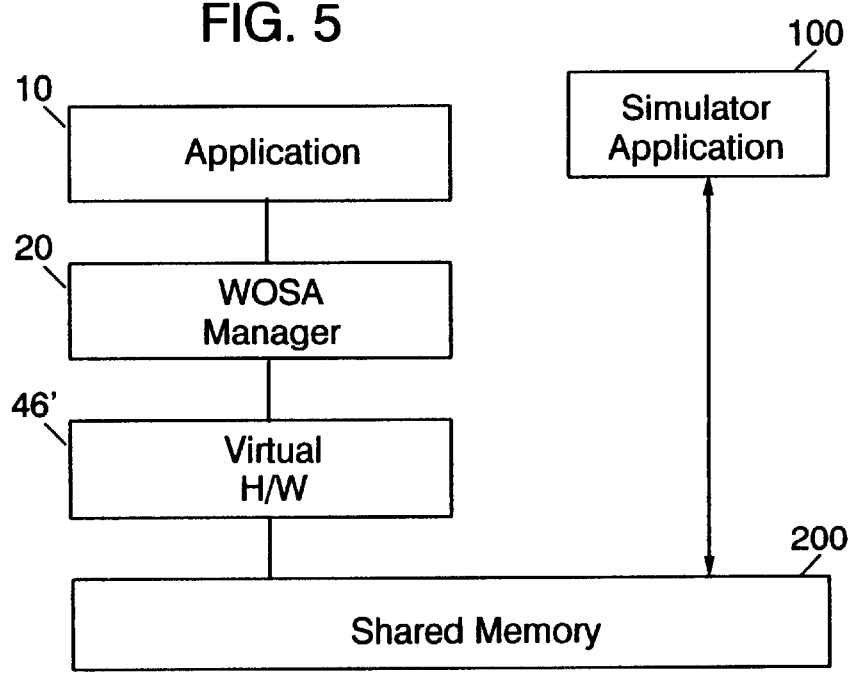
FIG. 5 is a model of the hardware simulator according to the invention for the transaction processing system of FIG. 1.
Figure 6:
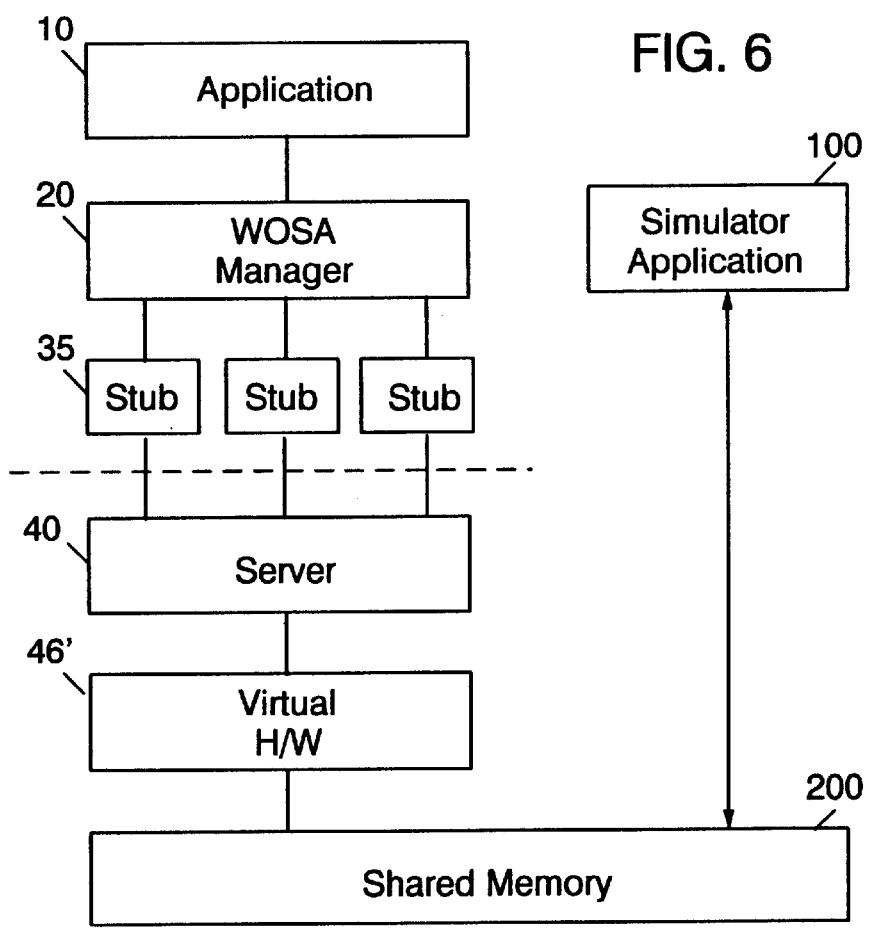
FIG. 6 is a model of the hardware simulator according to the invention for the transaction processing system of FIG. 2.

The Windows NT registry is a hierarchy of keys, FIG. 4, each key containing one or more data values. The WOSA Manager 20 uses the system provided HKEY_CLASSES_ROOT key to store and obtain data on Logical Service Providers, for example, "msrspm". The application 10 opens a service by providing the WOSA manager with that services' logical name 20. The manager finds the key entry, "msrspm" in the HKEY_CLASSES_ROOT\WOSA/XFS_ROOT\LOGICAL_SERVICES key for that service. One of the data fields, "provider", within that key is an entry describing the service provider key name, "testmsr". The manager then accesses the relevant service provider key within the HKEY_CLASSES_ROOT\WOSA/XFS_ROOT\SERVICE_PROVIDERS key, which will contain an entry describing the exact path to the physical dll that contains the executable code for that service provider, "d:\path\msrdll.dll".

In the conventional WOSA transaction processing system, the path to the physical file in the Windows registry will point to a service provider module 30, whereas for service providers who support the alternative model, the path points to a stub DLL 35. This stub DLL 35 will thus direct any WOSA transaction requests across the process boundary to the server 40 as described above.

In order to reduce processing overhead for applications, WOSA allows a library of standard forms to be defined, for example, a receipt or statement. When, for example, an application wishes to instruct a printer to print a form, it simply sends an identifier for the form as well as the user information to be printed on the form to the WOSA manager. This information is relayed to the server process and on to the SPM associated with the printer. The SPM is able to access the form library, and inserts the user information into the form before sending the information to the hardware DLL which converts the generic information into dedicated printer commands.

It will therefore be seen that the alternative transaction processing system provides a server which runs in a process separate from the application process, and is capable of handling all WOSA functions in a transparent manner to the application. This approach has a number of benefits. In the case of an audit trail, the server process is protected if the application process 10 dies, and vice-versa. Should the application die, when it restarts the server will inform it that it already has a session open. Conversely if the server dies, the application 10 will receive a timeout from the WOSA manager 20. A well written application can therefore recover from any abend and accurately update any audit trail.

It will also be seen that the alternative transaction processing system provides a solution flexible enough to take into account the possibility of various equipment vendor devices connected to the same system. If some vendor devices do not support the alternative transaction processing system, because they do not provide stub modules, then their respective SPMs can communicate directly with the WOSA manager 20 within the same process. The alternative system will still provide a benefit because both processes still operate and are able to inform one another of the status of a transaction in the event of a thread in either process abending.

The present invention overcomes the problem of developing applications using either of the systems of FIG. 1 or FIG. 2. The simulator package consists of two main components:

1) a set of virtual hardware DLLs 46'; and
2) a graphical simulator application 100

The simulator application 100 provides drag and drop user interaction to visually simulate actions including the entering and removal of magnetic cards/cash bills/deposit envelopes etc. WOSA events tied to these actions are automatically generated by the simulator application 100 and passed back to the user application 10.

Figure 7:
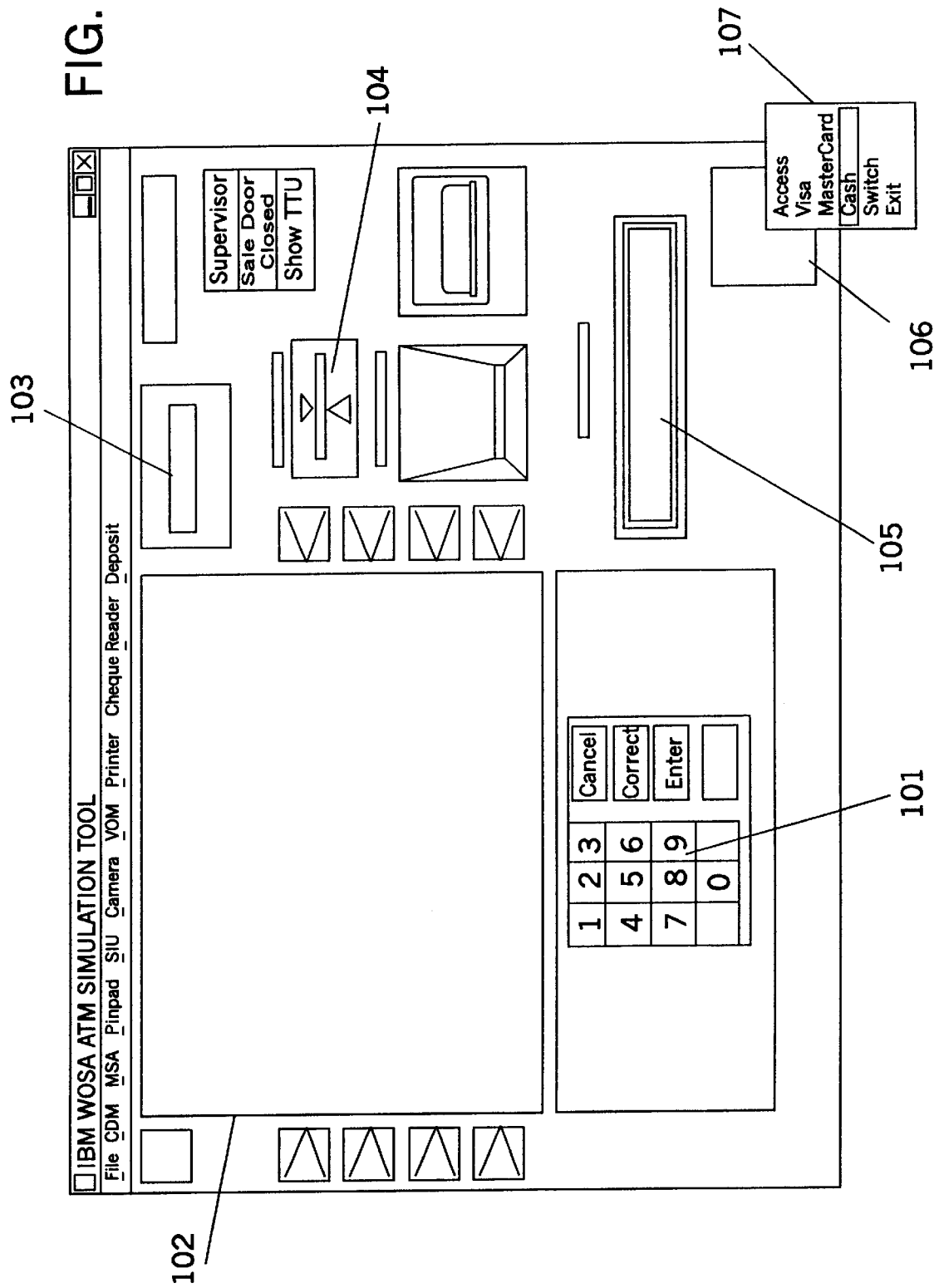
FIGS. 7 to 9 illustrate a front of screen display for the hardware simulator of FIGS. 5 and 6.

In the present embodiment, the graphical simulator application 100 runs on a desktop computer and provides graphical representation of all the hardware devices supported, in the visual form of a stylised Automated Teller Machine front panel, FIG. 7. In the present embodiment, the display includes a plurality of elements including a keypad 101, a screen 102, a receipt printer 103, a magnetic stripe reader 104, a cash dispenser 105 and a virtual wallet 106.

Each element of the display is controlled by a respective object, which reads and/or writes information to and from shared memory 200, as well as updating the graphical representation.

The virtual hardware DLLs 46' are designed following the specifications laid down for connection, via the service provider modules 30, to the server 40 or the WOSA manager 20 depending on whether the model of FIG. 1 or FIG. 2 is employed. The server 40 as explained above converts WOSA commands to a series of one or more generic hardware calls for the relevant WOSA device class type. WOSA support can be added to any given piece of hardware by simply packaging a low level virtual hardware DLL encapsulating the device driver for that device to the server 40 specifications.

In the case of the virtual hardware DLLs 46', they connect to areas of shared memory used by the main simulator application 100, so that hardware commands can be passed between the two, allowing hardware actions to be visually represented to the user, and 'status' or hardware events to be returned to the user application 10.

Figure 8:
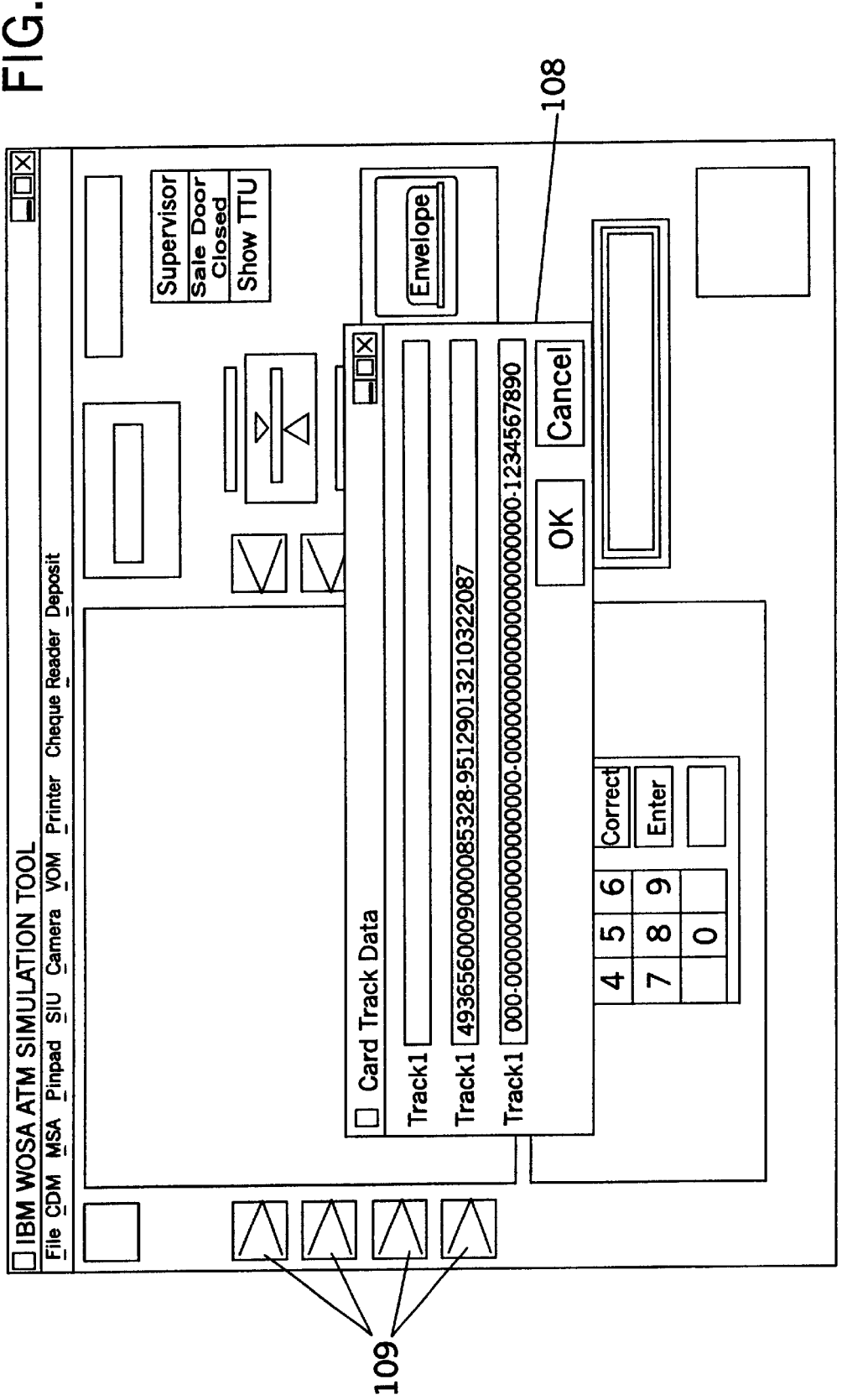

A typical sequence of operation begins when a user clicks on the wallet 106, and a pop-up window 107 is displayed providing a selection of cards which can be used with the ATM. The user selects a card, for example, Cirrus, and drags the card over the magnetic stripe reader representation 104. Each card in the virtual wallet has associated track data, which can be displayed in a window 108, FIG. 8. The information can be altered to simulate a bad read, or can be accepted by the user, after which it is written to a pre-determined location in shared memory 200. The magnetic stripe reader 104 has a corresponding virtual hardware DLL 46' which is continually polled. The hardware DLL 46' in turn monitors the pre-determined location in memory written to by the simulator and will detect when a magnetic stripe has just been read. The virtual hardware DLL 46' returns this information to the user application 10, via the server and/or WOSA manager or using the operating system messenger 50 as described above. The application 10 will then need to update the screen 102, to prompt the user to input a PIN number. A virtual hardware DLL 46' corresponding to the screen will thus be instructed to update the screen accordingly. The virtual hardware DLL 46', will update an area of shared memory allocated for the screen display. The simulator object controlling the screen 102 detects an update of the screen display area of shared memory and refreshes the display accordingly. The virtual hardware DLL 46' corresponding to the keypad 101 will now be polled continually. When the user inputs the PIN number, by clicking on the numbers of the keypad representation 101, another area of shared memory 200 will be updated accordingly by the keypad object. The associated virtual hardware DLL 46' detects the shared memory update and transmits the PIN number to the application 10.

Figure 9:
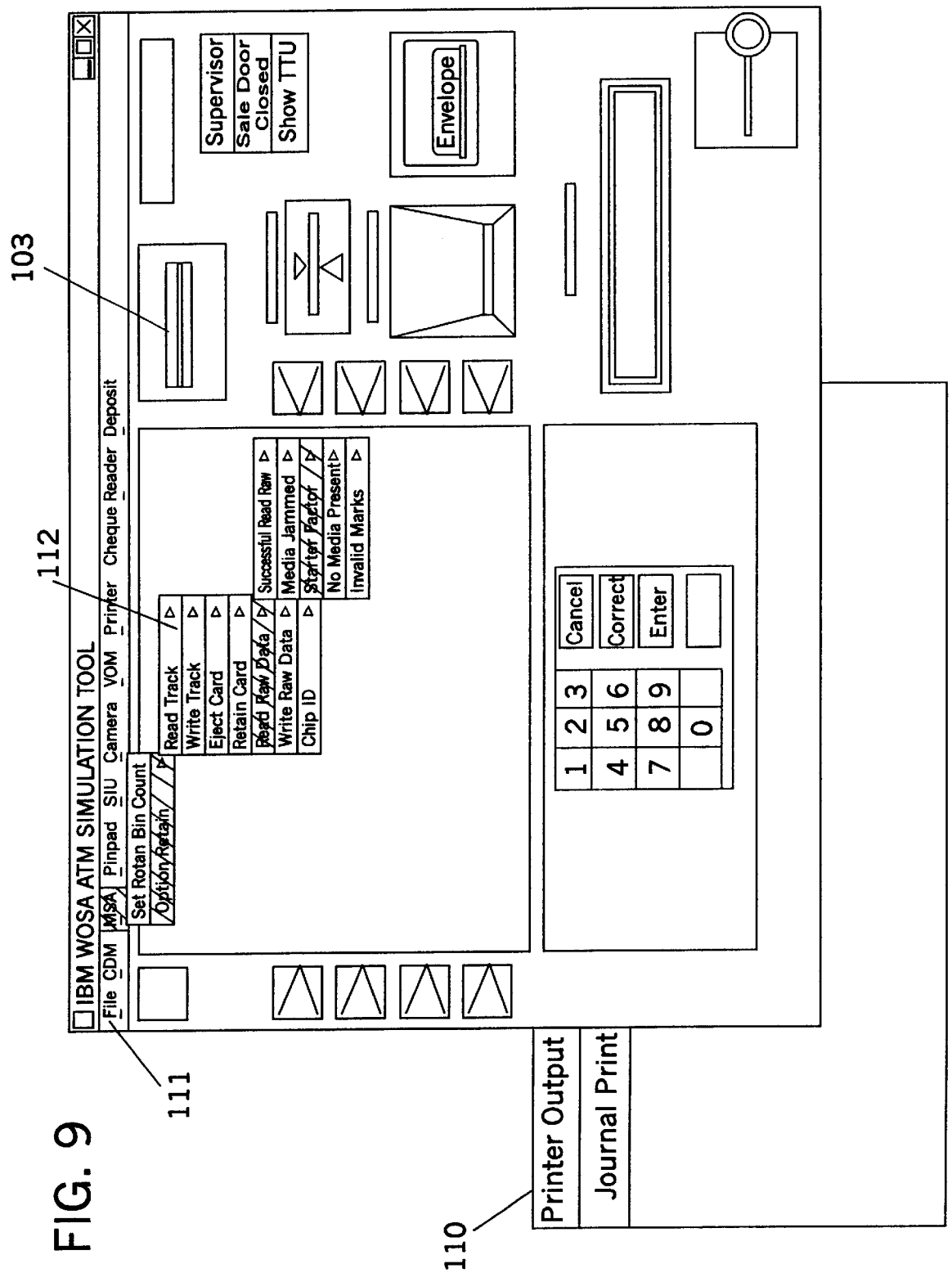

The sequence continues with the simulator 100 prompting the user with the different transaction options available, for example, deposit, print statement, withdraw cash etc., and the user selecting the options by clicking on the function key representations 109. Some options will require a print-out, for example, from the receipt printer 103. When the application 10 causes the virtual hardware DLL 46' for the receipt printer 103 to place the information to be printed in shared memory 200, the simulator printer object will cause the graphical representation to show a printed receipt issued by the printer. This would normally prove quite difficult to read and so the printer object is also able to display the printed information in a window 110, FIG. 9, which the user can more easily read, and if required copy and paste to other applications.

The simulator application 100 includes menu options 111 which are provided to tailor the input and output of the simulator, enabling any given scenario to be simulated. Thus, the simulator can support the concept of test scripts, where repetitive test sequences as described above can be run without the need for human operator input or intervention.

It is possible, via pulldown menus 111, to modify the WOSA return code on any given command that the simulator application 100 will return. Thus, in the example of FIG. 9, the user has selected the magnetic stripe reader (MSR) option from the menu 111 which causes a pop-up menu to display. The user can then select to modify the operation return, causing another pop-up menu 112 to display. In the example, the user then selects "read raw data" and then "shutter failure". This return code is then passed back to the application 10, whose response can then be tested accordingly.

It is also possible by the same means to modify the capabilities and status information that the simulator returns. Using this method, all logic paths through an application 10 can be simulated without the need for hardware testing.

It will be seen that many variations of the present embodiment are possible. For example, the mechanism by which the virtual hardware modules and the simulator communicate with one another need not specifically be a block of shared memory. It is possible to use an operating system messenger as a conduit for communication.

In this case, the hardware modules relay transaction requests to the simulator by raising pre-determined operating system events. The simulator tool listens for such events and updates appropriate hardware device graphical representations in response to these events. The simulator tool in turn raises operating system events in response to user interaction and the hardware modules which listen for these events relay the user interaction information to the application either through the WOSA manager or the operating system messenger.

This variation makes the task of managing the shared resources needed for communication between the simulator and hardware modules easier, although it places a greater burden on the operating system by requiring it to manage simulator related events. These simulator events could interfere with events transmitted between the hardware modules and the application and could invalidate the testing of the application using the simulator.

What is claimed is:
1. A hardware simulator for a transaction processing system, said transaction processing system being responsive to transaction requests from an application, said simulator comprising:
    a set of virtual hardware modules for simulating execution of transaction requests, each virtual hardware module being responsive to transaction requests for one of a set of simulated hardware devices, relayed from said transaction processing system and writing said requests to an area of memory shared between said virtual hardware modules and a simulator tool;
    said tool graphically representing said set of simulated hardware devices, each hardware device graphical representation being allocated an area of said memory shared between said tool and a virtual hardware module, said tool monitoring said areas of shared memory and updating a hardware device graphical representation in response to a transaction request being written to an area of shared memory allocated to said graphical representation, said simulator tool is responsive to user interaction with one or more of said hardware device graphical representations, said tool writing the results of said user interaction to an area of shared memory allocated to at least one of said graphical representations, one or more of said virtual hardware modules monitors an allocated area of shared memory, and communicates with said application in response to a user interaction result being written to said monitored allocated area of shared memory;
    said transaction processing system including:
        a transaction manager running in the same process as the application;
        a set of stub modules running in the same process as the application, each stub module relaying transaction request data passed from said transaction manager across a process boundary; and
        a server running in a second process, said server receiving requests from said set of stub modules across the process boundary and to queue said requests for execution; and
        said set of virtual hardware modules is responsive to transaction requests relayed from said server.
2. A hardware simulator as claimed in claim 1 wherein said virtual hardware modules simulate execution of said requests in separate threads of said second process.
3. A hardware simulator as claimed in claim 1 wherein each stub module corresponds to a hardware device graphical representation.
4. A hardware simulator as claimed in claim 1 wherein said server and said transaction manager communicate bi-directionally, the stub modules receive responses from the second process and pass said responses to said transaction manager.
5. A hardware simulator as claimed in claim 1 wherein said transaction processing system is implemented on a Windows NT operating system, said operating system including a Windows registry, said stub modules are implemented as stub dynamic link libraries which are registered in the registry and said transaction manager calls said stub DLLs by looking up the Windows registry.
6. A hardware simulator as claimed in claim 5 wherein said transaction manager is a Windows Open System Architecture (WOS) manager, said transaction requests are WOSA calls and said manager relays said WOSA calls to said server via said stub modules, said server converting said WOSA calls into constituent components, each component corresponding to a low level generic hardware function call.
7. A hardware simulator as claimed in claim 6, said simulator graphically representing a printer, said printer representation responsive to a virtual hardware module comprising a service provider module and a virtual hardware dynamic link library, the system including a plurality of WOSA forms and said service provider module reading said WOSA forms and combining transaction request data with a transaction request form before forwarding said combination to said virtual hardware module.
8. A hardware simulator as claimed in claim 5 where each virtual hardware module comprises a service provider dynamic link library and a virtual hardware dynamic link library.
9. A hardware simulator for a transaction processing system, said transaction processing system being responsive to transaction requests from an application, said simulator comprising:

a set of virtual hardware modules for simulating execution of transaction requests, each virtual hardware module being responsive to transaction requests for one of a set of simulated hardware devices, relayed from said transaction processing system and writing said requests to an area of memory shared between said virtual hardware modules and a simulator tool;

said tool graphically representing said set of simulated hardware devices, each hardware device graphical representation being allocated an area of said memory shared between said tool and a virtual hardware module, said tool monitoring said areas of shared memory and updating a hardware device graphical representation in response to a transaction request being written to an area of shared memory allocated to said graphical representation, said simulator tool is responsive to user interaction with one or more of said hardware device graphical representations, said tool writing the results of said user interaction to an area of shared memory allocated to at least one of said graphical representations, one or more of said virtual hardware modules monitors an allocated area of shared memory, and communicates with said application in response to a user interaction result being written to said monitored allocated area of shared memory;

said transaction processing system including:
 a transaction manager running in the same process as the application; and
 a set of service provider modules running in the same process as the application, each service provider module relaying transaction request data passed from said transaction manager to a virtual hardware module.

10. A hardware simulator as claimed in claim 9, said simulator graphically representing a printer, said printer representation controlled by a virtual hardware module comprising a service provider module and a virtual hardware dynamic link library, the system including a plurality of WOSA forms and said service provider module reading said WOSA forms and combining transaction request data with a transaction request form before forwarding said combination to said virtual hardware module.

11. A hardware simulator as claimed in claim 10 wherein each virtual hardware module comprises a service provider dynamic link library and a virtual hardware dynamic link library.

12. A computer program product embodied in computer useable medium for simulating hardware of a transaction processing system, said transaction processing system being responsive to transaction requests from an application, said computer useable medium comprising:

computer useable program code means embodying a set of virtual hardware modules for simulating execution of transaction requests in a computer, each virtual hardware module being responsive to transaction requests for one of a set of simulated hardware devices relayed from said transaction processing system and writing said requests to an area of a memory shared between said virtual hardware modules and;

computer useable program code means embodying a simulator tool in said computer, said tool graphically representing said set of simulated hardware devices, each hardware device graphical representation allocated an area of said memory shared between said tool and a virtual hardware module, said tool monitoring said areas of shared memory and updating a hardware device graphical representation in response to a transaction request being written to an area of said shared memory allocated to said graphical representation;

said computer useable program code means embodying a simulator tool, causes said computer to be responsive to user interaction with at least one of said hardware device graphical representation, said tool writing the results of said user interaction to an area of said shared memory allocated to said at least one of said hardware device graphical representation; and said computer useable program code means embodying a set of virtual hardware modules for simulating execution of transaction requests in a computer, at least one of said virtual hardware modules monitors said allocated area of shared memory, and communicates with said application in response to a user interaction result being written to said allocated area of shared memory, and;

wherein said transaction processing system includes:
 a transaction manager running in a same process as said application;
 a set of stub modules running in said same process as said application, each stub module relaying transaction request data passed from said transaction manager across a process boundary; and
 a server running in a second process, said server receiving requests from said set of stub modules across said process boundary and to queue said requests for execution; and
 said computer useable program code means embodying a set of virtual hardware modules for simulating execution of transaction requests in a computer, causes said set of virtual hardware modules to be responsive to transaction requests relayed from said server.

13. A computer program product of claim 12 wherein said virtual hardware modules simulate execution of said requests in separate threads of said second process.

14. A computer program product of claim 12 wherein each stub module corresponds to a hardware device graphical representation.

15. A computer program product of claim 12 wherein said server and said transaction manager communicate bi-directionally, the stub modules receive responses from the second process and pass said responses to said transaction manager.

16. A computer program product of claim 12 wherein said transaction processing system is implemented on a Windows NT operating system, said operating system including a Windows registry, said stub modules are implemented as stub dynamic link libraries which are registered in the registry and said transaction manager calls said stub DLLs by looking up the Windows registry.

17. A computer program product of claim 16 wherein said transaction manager is a Windows Open System Architecture (WOSA) manager, said transaction requests are WOSA calls and said manager relays said WOSA calls to said server via said stub modules, said server converting said WOSA calls into constituent components, each component corresponding to a low level generic hardware function call.

18. A computer program product of claim 17 wherein,
 said computer useable program code means embodying a simulator tool causes said computer to graphically represent a printer, said printer representation controlled by a virtual hardware module comprising a service provider module and a virtual hardware dynamic link library, the system including a plurality of WOSA forms and said service provider module reading said WOSA forms and combining transaction request data with a transaction request form before forwarding said combination to said virtual hardware module.

19. A computer program product of claim 16 wherein, each said virtual hardware module comprises a service provider dynamic link library and a virtual hardware dynamic link library.

20. A computer program product embodied in computer useable medium for simulating hardware of a transaction processing system, said transaction processing system being responsive to transaction requests from an application, said computer useable medium comprising:

computer useable program code means embodying a set of virtual hardware modules for simulating execution of transaction requests in a computer, each virtual hardware module being responsive to transaction requests for one of a set of simulated hardware devices relayed from said transaction processing system and writing said requests to an area of a memory shared between said virtual hardware modules and;

computer useable program code means embodying a simulator tool in said computer, said tool graphically representing said set of simulated hardware devices, each hardware device graphical representation allocated an area of said memory shared between said tool and a virtual hardware module, said tool monitoring said areas of shared memory and updating a hardware device graphical representation in response to a transaction request being written to an area of said shared memory allocated to said graphical representation;

said computer useable program code means embodying a simulator tool, causes said computer to be responsive to user interaction with at least one of said hardware device graphical representation, said tool writing the results of said user interaction to an area of said shared memory allocated to said at least one of said hardware device graphical representation; and said computer useable program code means embodying a set of virtual hardware modules for simulating execution of transaction requests in a computer, at least one of said virtual hardware modules monitors said allocated area of shared memory, and communicates with said application in response to a user interaction result being written to said allocated area of shared memory, and;

wherein said transaction processing system includes:
  a transaction manager running in the same process as the application; and
  a set of service provider modules running in the same process as the application, each service provider module relaying transaction request data passed from said transaction manager to a virtual hardware module.

21. An article of manufacture comprising:

a computer useable medium having computer readable program code means embodied therein for simulating hardware of a transaction processing system, said transaction processing system being responsive to transaction requests from an application, said article of manufacture comprising:

computer readable program code means embodying a set of virtual hardware modules for simulating execution of transaction requests in a computer, each virtual hardware module being responsive to transaction requests for one of a set of simulated hardware devices relayed from said transaction processing system and writing said requests to a memory shared between said virtual hardware modules and;

computer readable program code means embodying a simulator tool in said computer, said tool graphically representing said set of hardware devices, each hardware device graphical representation being allocated an area of said memory shared between said tool and a virtual hardware module, said tool monitoring said areas of shared memory and updating a hardware device graphical representation in response to a transaction request being written to an area of said shared memory allocated to said graphical representation;

said computer readable program code means embodying a simulator tool causes said computer to be responsive to user interaction with at least one of said hardware device graphical representation, said tool writing the results of said user interaction to an area of said shared memory allocated to said at least one of said hardware device graphical representations; and said computer readable program code means embodying a set of virtual hardware modules in a computer for simulating execution of transaction requests, at least one of said virtual hardware modules monitoring said allocated area of shared memory, and communicates with said application in response to a user interaction result being written to said allocated area of shared memory, and wherein;

each said virtual hardware module comprises a service provider dynamic link library and a virtual hardware dynamic link library.

* * * * *